(12) United States Patent
Turner et al.

(10) Patent No.: US 6,897,429 B1
(45) Date of Patent: May 24, 2005

(54) MANAGING POWER CONSUMPTION BY SAMPLING CIRCUIT CURRENT SOURCES

(75) Inventors: Richard M. Turner, Mountain View, CA (US); Peter J. Manca, Sunnyvale, CA (US)

(73) Assignee: Foveon, Inc., Santa Clara, CA (US)

( * ) Notice: Subject to any disclaimer, the term of this patent is extended or adjusted under 35 U.S.C. 154(b) by 276 days.

(21) Appl. No.: 10/364,721

(22) Filed: Feb. 10, 2003

(51) Int. Cl.[7] .............................................. H01J 40/14

(52) U.S. Cl. ............................. 250/214 R; 250/208.1

(58) Field of Search ....................... 250/214 R, 208.1, 250/214.1, 205; 327/514, 515; 348/294, 297, 309

(56) References Cited

U.S. PATENT DOCUMENTS 5,448,156 A * 9/1995 Tsay ........................... 323/312
2002/0058353 A1 5/2002 Merrill

* cited by examiner

*Primary Examiner*—Que T. Le
(74) *Attorney, Agent, or Firm*—Sierra Patent Group, Ltd.

(57) ABSTRACT

An image sensor includes a plurality of pixel sensors arranged in at least one row and a plurality of columns. Each pixel sensor includes a photosensor to generate a photosensor output signal nominally indicative of an intensity of light incident on the photosensor. Each pixel sensor is configured to provide a signal corresponding to the photosensor output signal at an output of the pixel sensor. For each column, a column line couples together the outputs of the pixel sensors belonging to that column and terminates in a column node for that column. Column output circuitry associated with each column provides to image sensor sampling circuitry a signal corresponding to the column node for that column, based on an asserted state of a column enable signal for that column. Power consuming circuitry is associated with each column and is controllable between at least a normal power mode and a minimal power mode such that, when the power consuming circuitry associated with a particular column is in the minimal power mode, signals representing photosensor output signals generated by photosensors of that column's pixel sensors are prevented from being reliably sampled by the image sensor sampling circuitry. Controller circuitry coordinates the control of the power mode of the power consuming circuitry associated with each column with the state of the column enable signal for that column.

30 Claims, 7 Drawing Sheets

MANAGING POWER CONSUMPTION BY SAMPLING CIRCUIT CURRENT SOURCES

TECHNICAL FIELD

The present invention is in the field of current source power management and, in particular, relates to coordinating the activation of power-consuming circuitry for data-sampling, readout, conversion, amplification or other processing with the utilization of the power-consuming circuitry.

BACKGROUND

Power-consulting circuits that sample, convert, readout, amplify or otherwise process data, or signals that represent data, are known in the art. For example, an image sensor typically includes a plurality of pixel sensors arranged in an array. To sample the signals generated by the pixel sensors, a column switch for each column of the array selectively couples a column line for that column to an output bus while one or more rows of the array are selected. That is, selecting one or more rows of the array causes the pixel sensors of the selected rows to be coupled to the column lines for the columns to which the pixel sensors belong, and selecting the column line for a particular column causes that column line to be coupled to the output bus, which allows the pixels of that column that are within the one or more selected rows to be sampled at the output bus.

For an image sensor whose pixel sensors are active pixel sensors, a DC source is typically associated with each column to generate and provide a bias current to the active pixel sensors of that column. More particularly, each active pixel sensor includes a follower-type pixel amplifier that provides a buffered voltage output signal. The buffered voltage output signal is representative of an integrated charge generated by a photodiode of the active pixel sensor in response to incident light. The bias current generated and provided by the DC source enables the pixel amplifier for each pixel sensor to provide the buffered output voltage to a column line for the column to which that pixel sensor belongs, as described in the previous paragraph.

Conventionally, the DC bias current source for each column remains activated (and, thus, consumes power) even when the column line for that column is not selected to be coupled to the output bus. It is desirable to minimize the amount of power consumption in such circuits (and/or for other power consuming circuits, which when not operating, are such that signals generated by photosensors of the pixel sensors are prevented from being reliably sampled or read from the pixel sensor array, or otherwise processed), particularly when the circuits are part of a portable, battery-powered device.

Conventional "power save" circuitry typically operates by putting power consuming circuitry into a sleep mode based on measuring some period of inactivity. Then some action (independent of the normal operation of the power consuming circuitry) causes the power consuming circuitry to be reactivated. An example of such an action is the activation of a user interface feature. During the reactivation period, the power consuming circuitry is non-operable (or, at least is not reliably operable) and not available for use. It is desirable, then, to control the consumption of power by such power consuming circuitry, but to do so in a way that does not interfere with the reliable operation of the power consuming circuitry and that does not require user intervention or other mechanisms for monitoring activity in the device.

For example, with respect to an image sensor, it is desirable to control the consumption of power by bias current source circuitry associated with the columns, but to do so in such a way that the output values of the follower-type amplifiers for the pixels of each column are reliably available when required (e.g., when the column line for that column is selected to be coupled to the output bus). Similarly, other power consuming circuits such as column amplifiers in an image sensor may also be powered on in a manner that makes them operational only when or just before they are needed for readout of the signals.

SUMMARY

An image sensor includes a plurality of pixel sensors arranged in at least one row and a plurality of columns. Each pixel sensor includes a photosensor to generate a photosensor output signal nominally indicative of an intensity of light incident on the photosensor. Each pixel sensor is configured to provide a signal corresponding to the photosensor output signal at an output of the pixel sensor.

For each column, a column line couples together the outputs of the row select switches associated with the pixel sensors belonging to that column and terminates in a column node for that column. Column output circuitry associated with each column provides to image sensor sampling circuitry a signal corresponding to the column node for that column, based on an asserted state of a column enable signal for that column.

Power consuming circuitry is associated with each column and is controllable between at least a normal power mode and a minimal power mode such that, when the power consuming circuitry associated with a particular column is in the minimal power mode, signals representing photosensor output signals generated by photosensors of that column's pixel sensors are prevented from being reliably sampled by the image sensor sampling circuitry.

Controller circuitry coordinates the control of the power mode of the power consuming circuitry associated with each column with the state of the column enable signal for that column.

In accordance with some aspects, each pixel sensor includes a mechanism to select or otherwise couple the output signal from the photosensor to a column line, bus, or additional selection circuitry. The selection mechanism is typically a row select switch that selects the outputs of a given row of pixel sensors onto their corresponding column lines or output buses. The selection mechanism allows the pixel sensor to be de-coupled from the column line or output bus when other pixel sensors or circuitry are active and making use of the column line, bus, or additional circuitry that is connected to the pixel sensors of a given column. The column line for a column couples together the outputs of the row select switches associated with the pixel sensors belonging to that column.

In accordance with yet further aspects, an integrated circuit includes data element circuits. Activation of power-consuming circuitry associated with processing data from the data element circuits is coordinated with utilization of the power-consuming circuitry.

BRIEF DESCRIPTION OF THE DRAWINGS

FIG. 1 is a block diagram illustrating an example of the FIG. 1-1 portion 160, where a portion 100 of an image sensor array includes a decoder and look-ahead controller configured to control current source circuitry associated with the columns.

DETAILED DESCRIPTION

In accordance with an aspect of the invention, the power mode of power consuming circuitry associated with the columns of an image sensor is coordinated with the assertion of enable signals for the columns. In this manner, power consumption is controlled, but the output values of the columns are reliably available when required.

Figure 1:
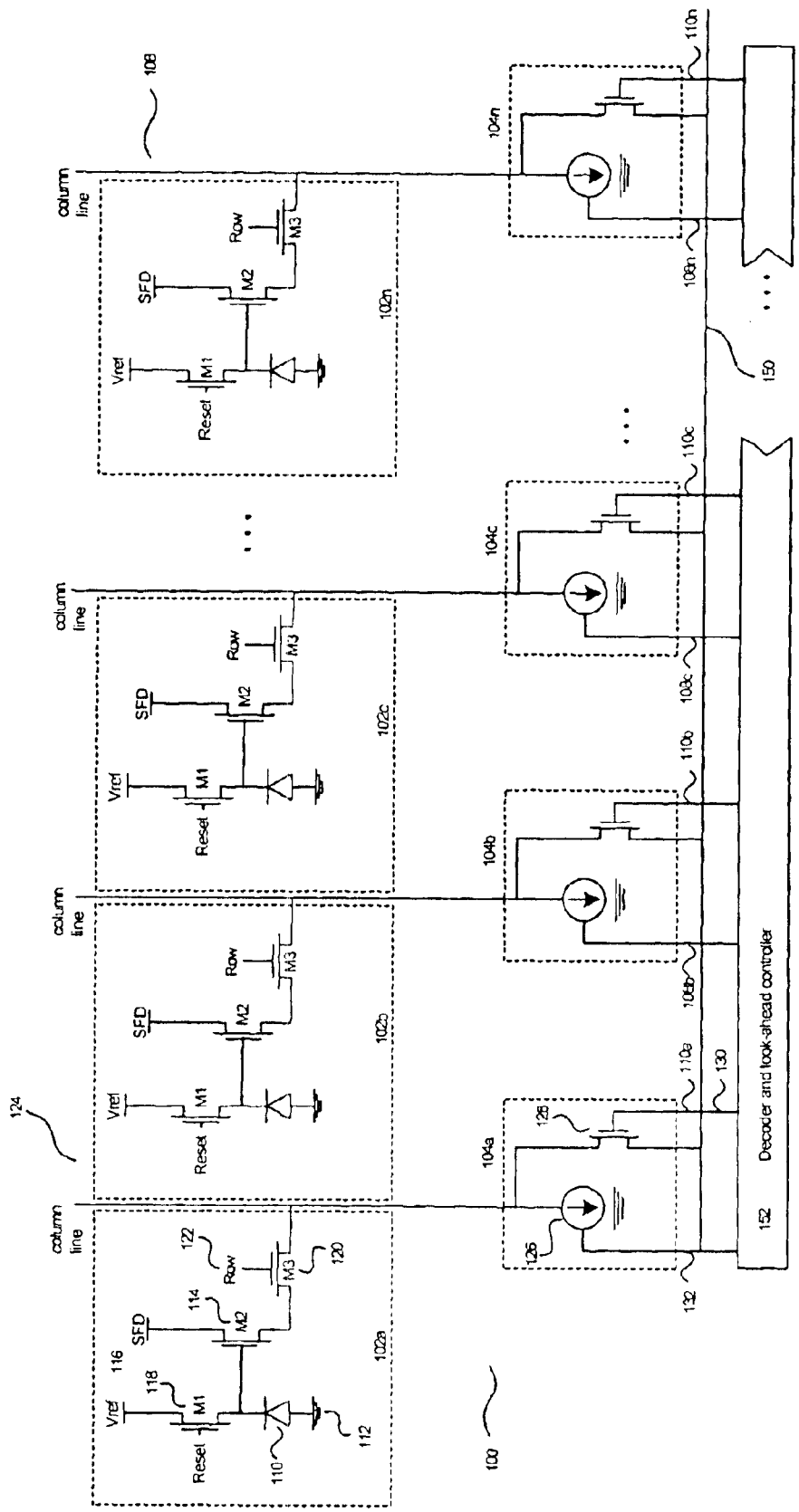
FIG. 1-1 is a block diagram illustrating a portion 160 of an image sensor array, including a decoder and look-ahead controller configured to control power consuming circuitry associated with the columns.
Figure 1:
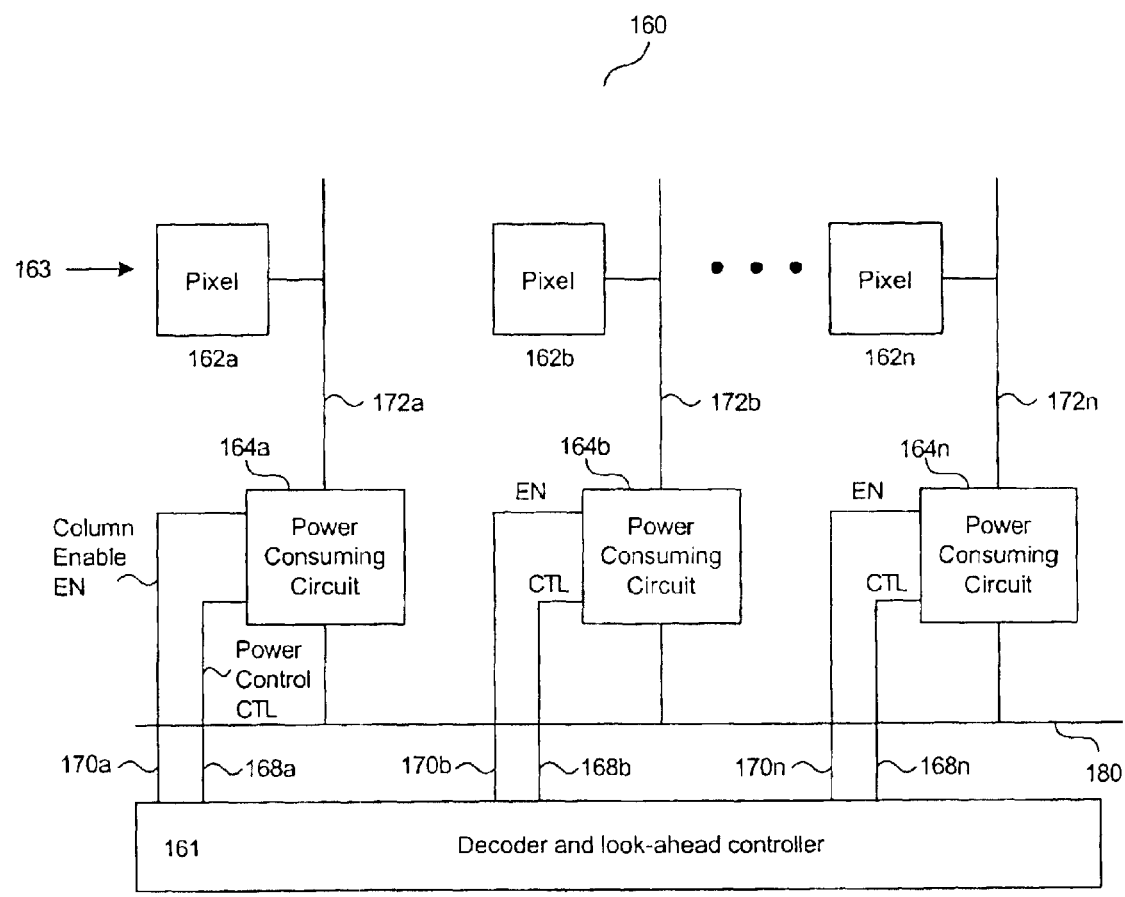

FIG. 1-1 illustrates this aspect. The FIG. 1-1 illustration is of a portion of an image sensor circuit 160. While only one row 163 of pixel sensors 162a through 162n (generically, 162) is shown, the image sensor circuit 160 may (and typically does) have more than one such row. In accordance with the FIG. 1-1 image sensor circuit portion 162, power consumption control techniques are applied to power consuming circuits 164a through 164n (generically, 164) associated with columns of the image sensor circuit.

A column signal for each column, corresponding to outputs of the pixel sensors 162 of that column, is selectively provided to a common line 180 based on the state (activated or deactivated) of an enable signal 170 for that column. The enable signals 170 for the columns are activated in the pattern with which it is desired for the column signals to be provided to the common line 150. The power consuming circuit 164 for each column is controllable between a normal power mode and a minimal power mode based on the state of a power control signal 168 for that column. When the power consuming circuit 164 for a particular column is in the minimal power mode, signals corresponding to outputs of the pixel sensors 162 of that column are prevented from being reliably provided to the common line 180.

A decoder and look-ahead controller 161 is provided to coordinate the enable signals 170 and the power control signals 168 such that, for at least a portion of the time that a particular column does not have its enable signal 170 asserted, the power consuming circuit 164 for that column is operating in a minimal power mode. On the other hand, the decoder and look-ahead controller 161 controls the power control signals such that the power control signal 168 for each particular column is asserted a sufficient time before the enable signal 170 for that column is asserted, such that at least enough time lapses between asserting the power control signal 168 and the enable signal 170 so that, when the column select signal is asserted, the power consuming circuitry for the column is already in the normal power mode.

We now turn to some specific examples of the FIG. 1-1 image sensor. FIG. 1 illustrates a case where the pixels are active pixel sensors and the power consuming circuit is a bias current source.

In a conventional image sensor circuit comprising active pixel sensors and column bias current sources, the column bias current sources (analogous to the bias current sources 126 in FIG. 1) are always on, and the state of the column enable lines determines which columns provide a column output signal to the common line. In one typical conventional image sensor that includes an array of pixel sensors organized in 1280 columns by 1024 rows, the column current sources each provide 10 $\mu$A, and there are 1280 bias current sources. This results in a total current flow of 12.8 mA, which represents a significant amount of power consumption.

In accordance with an aspect of the invention as illustrated by FIG. 1, a decoder and look-ahead controller 152 is provided to control the bias current sources 126 during normal operation of the image sensor 100 such that, for at least a portion of the time that a particular column does not have its column enable signal asserted, the bias current source 126 for that column is operating in a minimal power mode. When the bias current source 126 for a particular column is operating in a minimal power mode, a signal at the photodiode 10 for the active pixel sensors 102 of that column is prevented from being reliably provided to the column line 124 for that column (i.e., even if the column enable signal for that column is activated) Otherwise, when the bias current source 126 for a particular column is operating in a normal power mode, a signal at the photodiode 110 for the active pixel sensors 102 may be reliably provided to the column line 124 for that column. Each bias current source 126 is controlled between the minimal power mode and the normal power mode by a current source control signal 132 (a specific example of the power control signal 168 at FIG. 1-1).

Referring still to FIG. 1, the operation of the image sensor circuit 100 is described. The FIG. 1 illustration is of a portion of the image sensor circuit 100. That is, while only one row 108 of active pixel sensors 102a through 102n (generically, 102) is shown, the image sensor circuit 100 may (and typically does) have more than one such row. In accordance with the FIG. 1 image sensor circuit portion 100, as just discussed, power consumption control techniques are applied to the bias current source circuitry associated with the columns of the image sensor circuit.

The active pixel sensor 102 is described first. Each active pixel sensor 102 includes a photodiode 110 having its anode connected to a fixed voltage potential 112 (shown in FIG. 1 as ground). The cathode of the photodiode 110 is connected to a follower-type amplifier 114. The follow-type amplifier 114 may be, for example, a source-follower amplifier, a differential amplifier, or other type of amplifier that, in combination with a bias current 126 applied to the column line 124, provides a voltage output that corresponds to the signal charge or current generated by the photodetector 110. The cathode of the photodiode 110 is also connectable to a reference potential Vref 116, via a photosensor reset switch 118, so that the photodiode 110 is reverse biased. The output of the follower-type amplifier 114 is attached to a row select switch 120, which is connected to a row select line 122 and a column line 124. All row select switches 120 of the row 108 are connected to a common row select line 122.

The active pixel sensor 102 may be operated as follows. First, the active pixel sensor 102 is reset by turning on the photosensor reset switch 118. Then the photosensor reset switch 118 is turned off so that integration of photocurrent from photodiode 110 begins. The current from the photodiode 110 is integrated on the combined capacitance of the photodiode and the follower-type amplifier 114 input node to form a voltage signal. At the appropriate time, the voltage on the row select line 122 is raised, which activates the row select switch 120 (e.g., as shown, a field effect transistor) in the pixel sensor 102 (and, in fact, activates the row select switches in all the pixel sensors 102 of the row 108). This activation of row select switches 120 allows the follower-type amplifier 114 to drive the column line 124 with a column signal corresponding to the photocurrent collected by the photosensor in the selected pixel. In some embodiments of an image sensor, column line 124 then leads to more circuitry that amplifies and stores the column signal or manipulates the signal to perform offset or noise cancellation operations. In still other embodiments, the column signal may be converted to a digital form by analog-to-digital converter circuitry that corresponds to a single column or groups of columns, or that is connected to the common line 150.

It is noted that, in some cases, the photodetectors are in a single layer, and color filters are applied to the single layer in a mosaic pattern. In other cases, three separate layers of photodetectors are embedded in silicon forming a detector group and there are correspondingly three sets of pixel circuitry 102a associated with the detector group. Due to the difference in depth of the photodetectors (and the manner in which silicon absorbs different wavelengths of light at different depths), each layer records a different color. As a result, red, green, and blue light is captured at every pixel location. This is disclosed, for example, in U.S. patent application Publication U.S. 2002/0058353 dated May 16, 2002.

Referring still to FIG. 1, power consuming circuitry 104 includes the column bias current source 126 to provide a bias current to the follower-type amplifier 114 of each active pixel sensor 102 in the column with which the bias current source 126 is associated. (As discussed above, FIG. 1 shows only one row of active pixel sensors whereas, typically, an image sensor has many rows.) Circuitry 104 also includes a column select switch 128. When the colimn select switch 128 is activated by a column enable signal 130, the column signal (on column line 124) is provided to a common line 150. Typically, the column signals are provided to the common line 150 in sequence or in some other predictable pattern, with a decoder, shift register, or other logic controlling the assertion of the switches 128 that make the column signals available to the common line 150.

In one example, the decoder and look-ahead controller 152 operates to assert the column enable signal 130 (to activate the corresponding column select switch 128) of each column in sequence. The decoder and look-ahead controller 152 further operates to coordinate the assertion of the corresponding current source control signals 132 with the assertion of the column enable signals 130. That is, each corresponding bias current source 126 is changed from the minimal power mode to the normal power mode such that the bias current source 126 is in the normal power mode at least while the column select switch 128 for the column to which that bias current source 126 corresponds is activated.

The decoder and look-ahead controller 152 is configured to cause the assertion of the column enable signals 130 to be coordinated with the assertion of the current source control signals 132 such that each bias current source 126 is controlled to go from minimal power mode to normal power mode a sufficient time before the corresponding column select switch 128 is activated. By "sufficient time," it is meant that at least enough time lapses so that a signal representing the light incident on the pixel sensors of the column (or, at least, the pixel sensors of the column for which the row select switch is activated) is reliably provided to the common line 150 (as one example, accounting for a switch-on time of the bias current source 126 and/or the time for the follower-type amplifier 114 of the pixel sensors 102 for the column to stabilize). The time lapse may be, for example, fixed or programmable.

In some examples, the decoder and look-ahead controller 152 asserts the current source control signals 132 such that more than one bias current source 126 is in normal power mode at some times. For example, the assertion of current source control signals 132 may be "pipelined" as the column select switches 128 are activated in sequence. As another example, the column select switches 128 may be activated in groups and the current source control signals 128 may be asserted in corresponding groups. Activating the column select switches 128 in groups is disclosed, for example, in U.S. patent application Ser. No. 10/001,438 filed Oct. 24, 2001, and which is incorporated herein by reference in its entirety. In another example, the column select switches 128 may be activated in a sequence or pattern that skips some columns and, again, the controller 161 asserts the current source control signals 132 such that each current source is activated a sufficient time before the corresponding column selection switch 128 is activated.

Figure 2:
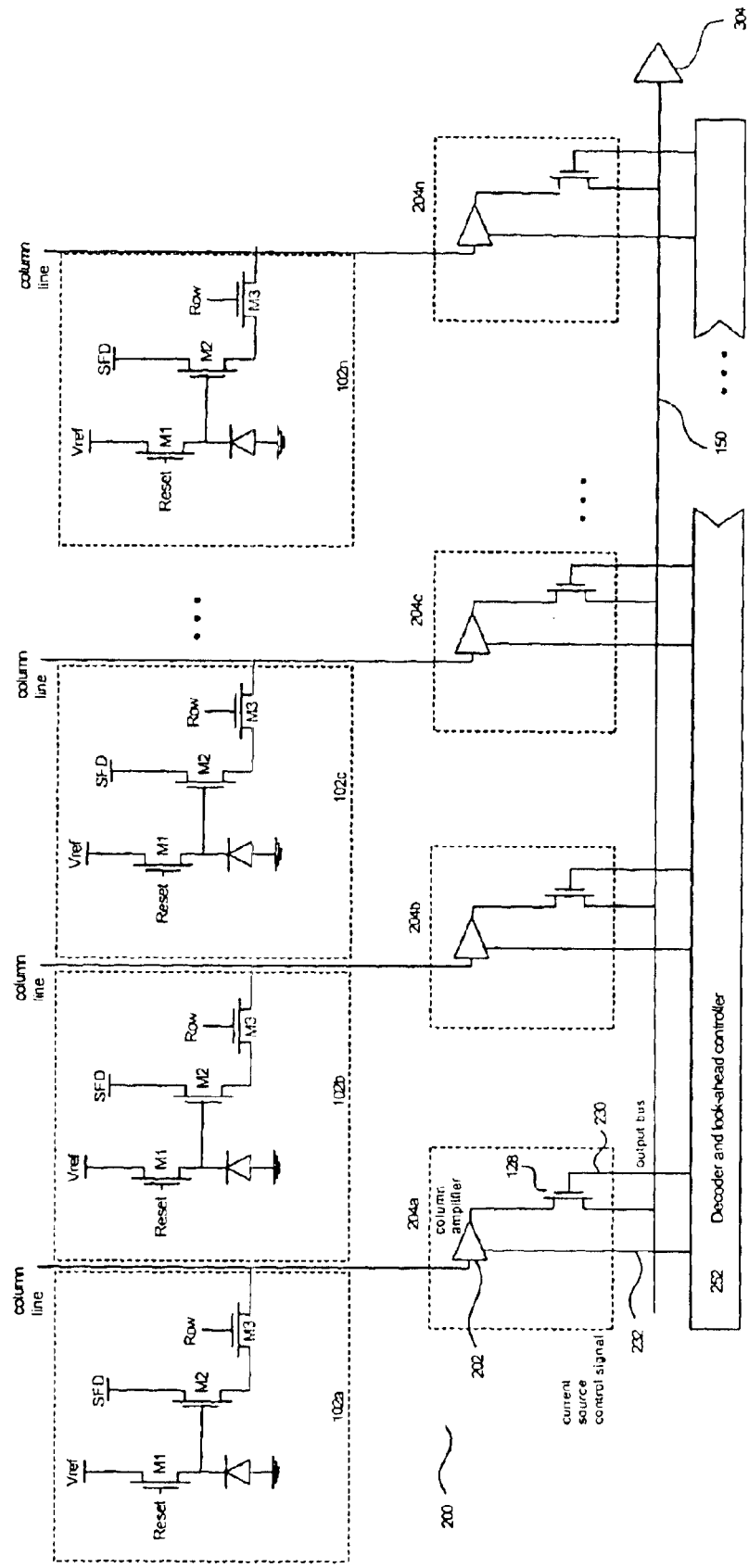
FIG. 2 illustrates a portion 200 of an image sensor array that is similar to the FIG. 1 image sensor array portion 100, except that the decoder and look-ahead controller is configured to control current source circuitry of amplifier circuitry corresponding to the columns.

Referring now to FIG. 2, another example of a circuit configured to utilize a power optimization technique is described. In accordance with the FIG. 2 circuit 200, power optimization techniques are applied to column-based amplifiers of an image sensor.

The FIG. 2 circuit is similar in many ways to the FIG. 1 circuit. In the FIG. 2 circuit, circuitry 204 includes a column amplifier 202, in addition to the column select switch 128. The column amplifiers 202 may be, for example, buffers, programmable gain amplifiers, offset cancellation amplifiers or correlated double sampling amplifiers. Each column amplifier 202 has associated with it at least one bias current source (not shown), and the bias current source is switchable from a minimal power mode to a normal power mode.

Similar to the FIG. 1 example, the decoder and look-ahead controller 252 operates to coordinate the assertion of the column enable signals 230 and the assertion of current source control signals 232 (a specific example of the power control signal 168 of FIG. 1-1). The assertion of the different column select signals may be, for example, sequential, in groups, or in a pattern. The requirements for "sufficient time" between asserting the current source control signal 232 and asserting the corresponding column enable signal 230 for the column may depend, for example, on the stabilization delay for the amplifier (which may be, for example, a characteristic of the type and function of the amplifier). The decoder and look-ahead controller 252 allows the time between the assertion of the current source control signal and the column enable signal to be fixed, or it may be programmable depending, for example, a least in part on the column amplifier characteristics.

Figure 3:
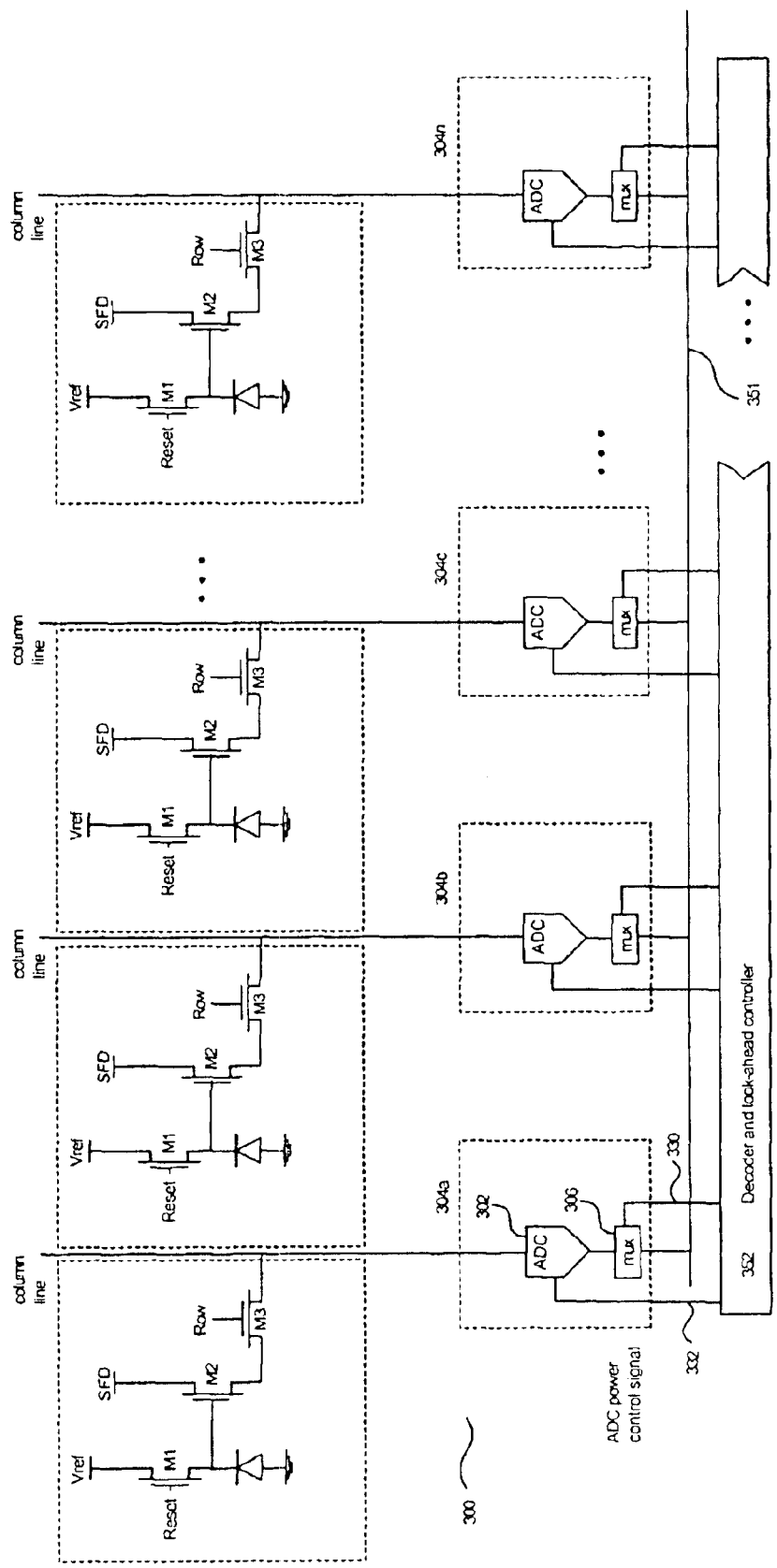
FIG. 3 illustrates a portion 300 of an image sensor array that is similar to the FIG. 1 image sensor array portion 100, except that the decoder and look-ahead controller is configured to control current source circuitry of analog-to-digital conversion circuitry corresponding to the columns.

Referring now to FIG. 3, yet another example of a circuit configured to utilize a power optimization technique is described. In accordance with the FIG. 3 circuit 300, a power optimization technique is applied to column-based analog-to-digital converters 302 (ADC's) of an image sensor. The FIG. 3 circuit 300 has many similarities to the FIG. 1 and FIG. 2 circuits. In the FIG. 3 circuit 300, power-consuming circuitry 304 includes an ADC 302 and a multiplexor 306. In operation, the ADC 302 for a column converts the analog column signal for that column into an equivalent digital signal for that column. The digital signal for that column is multiplexed by the multiplexor 306 onto an output digital data bus 351.

The ADC 302 is switchable between a minimal power mode and a normal power mode based on the state of an ADC power control signal 332 (a specific example of the power control signal 168 of FIG. 1-1). In the minimal power mode, the ADC 302 is prevented from reliably presenting at its output a digital signal that is the equivalent of the analog column signal. In addition, the multiplexor 306 is selectable to either present or not present the digital signal output from the ADC 302 to the output digital data bus 351, based on the state of a column enable signal 330.

The decoder and look-ahead controller 352 operates to coordinate the assertion of the column enable signals 330 and the assertion of the ADC power control signal 332. The requirements for "sufficient time" between asserting the ADC power control signal 332 and asserting the column select signal 330 for the column may depend, for example, on how long it takes for the ADC 302 to convert an analog signal presented at its input to a digital signal at its output. The "sufficient time" requirements may also depend on the architecture of the ADC 302 and/or the power-on time of the ADC 302. The decoder and look-ahead controller 352 allows the time between the assertion of the ADC power control signal and the column select signal to be fixed, or it may be programmable depending, for example, on the ADC characteristics and timing requirements.

In summary, several examples have been described in which power consuming circuitry associated with columns of an image sensor are coordinated with sampling the column signals in a manner that controls power consumption to be lower than if the power consuming were constantly consuming power, but does not detrimentally affect the operation of the image sensor including the ability to reliably sample image data from the image sensor.

Figure 4:
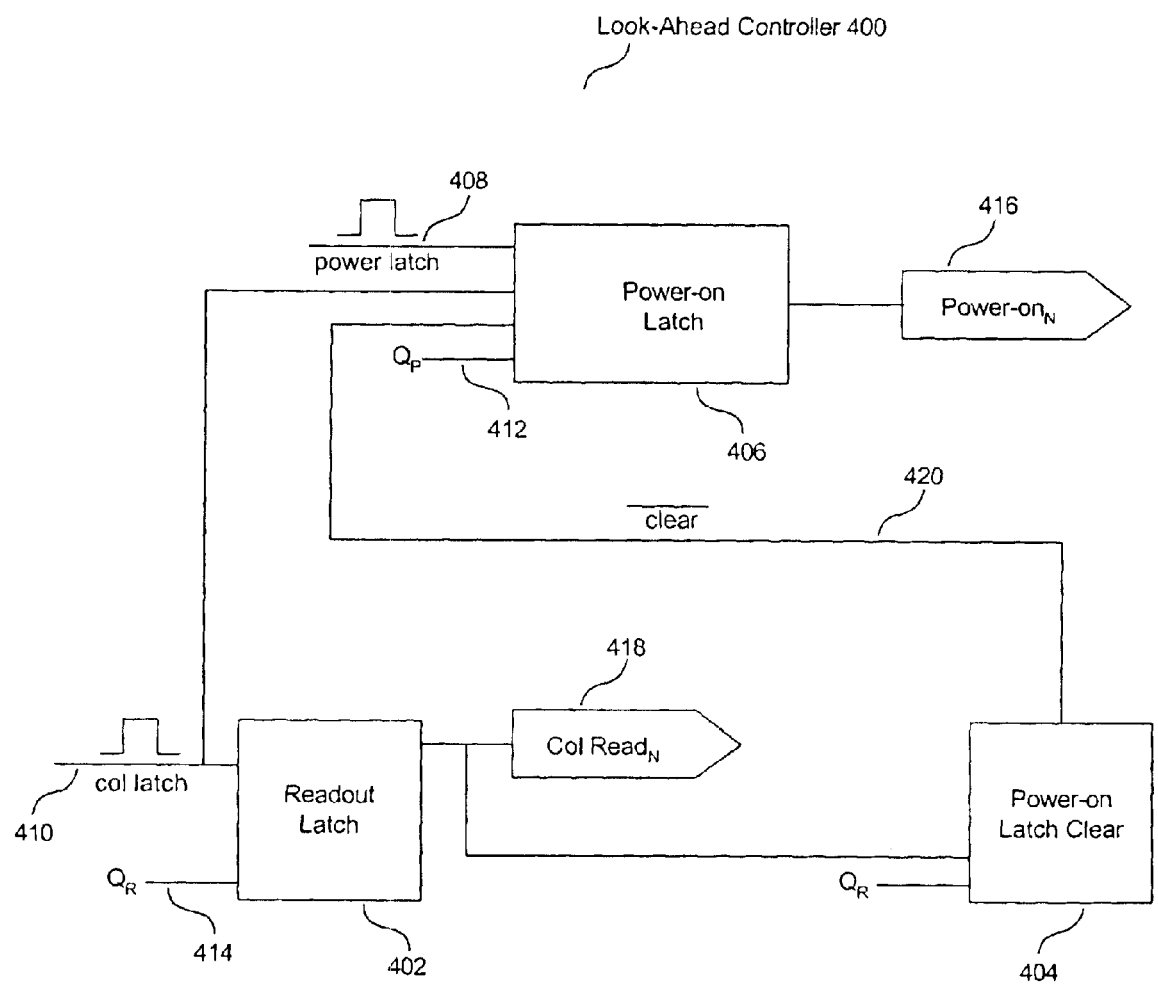
FIG. 4 is a block diagram of the look-ahead controller circuit portion of the decoder and look-ahead controller of FIGS. 1 through 3.

Referring now to FIG. 4, a block diagram of an example look-ahead controller portion of a decoder and look-ahead controller is described. The FIG. 4 example corresponds to circuitry useable to coordinate the assertion of the column enable signal with the assertion of the power control signal, for a single column. In operation, the decoder (not shown) generates power-on control signals ($Q_P$412 in FIG. 4) and readout control signals ($Q_R$414) for the columns. Referring to FIG. 4, the power-on control signal ($Q_P$) for a particular column is sampled during a first clock phase, based on a pulse of a power latch signal 408. The readout control signal ($Q_R$414) for the particular column is sampled during a second clock phase, based on a pulse of a column latch signal 410. While the power-on control signal $Q_P$412 and readout control signal $Q_R$414 have been described as separate signals and are shown as such in FIG. 4, they are, in accordance with the circuit implementation shown in FIG. 6, different phases of a single signal. In the description that follows, this "single signal" is referred to in some instances simply as the decoder output signal Q. While the embodiment described herein employs a single signal Q, the circuit could also be implemented with two separate signals ($Q_P$ and $Q_R$) as is conceptually described in FIG. 4 in conjunction with the following description.

More specifically, if the power-on control signal ($Q_P$412) is asserted during the power latch signal 408 pulse, then the Power-On Latch control circuitry 406 causes the Power-On latch 416 (which corresponds, for example, to the current source or power control signals 132, 232, and 332 of FIGS. 1, 2 and 3, respectively) for the column to be asserted. The Power-On latch 416 holds the asserted state until the column value has been sampled, such that the Power-On latch 416 may be reset. Furthermore, if the readout control signal ($Q_R$414) is asserted during the column latch signal 410 pulse, then the Column-Read latch 418 (which corresponds for example, to the column enable signals 170, 130, 230 and 330 of FIGS. 1-1, 1, 2, and 3, respectively) is asserted. A mechanism for causing the Power-On latch 416 to stay asserted, and to be reset, is now described.

Specifically, if the Column-Read latch 418 is asserted and the $Q_R$414 signal is not asserted, then the Power-On Latch clear circuitry 404 causes the clear-bar signal 420 to be asserted. (Otherwise, the clear-bar signal is not asserted.) In turn, the Power-On Latch control circuitry 406 operates to deassert the Power-On latch 416. In particular, if the clear-bar signal 420 is asserted while the readout control signal ($Q_R$414) for the column is not asserted during the second clock phase (based on a pulse of a column latch signal 410), then the Power-On Latch control circuitry 406 causes the Power-On latch 416 to be deasserted.

Figure 5:
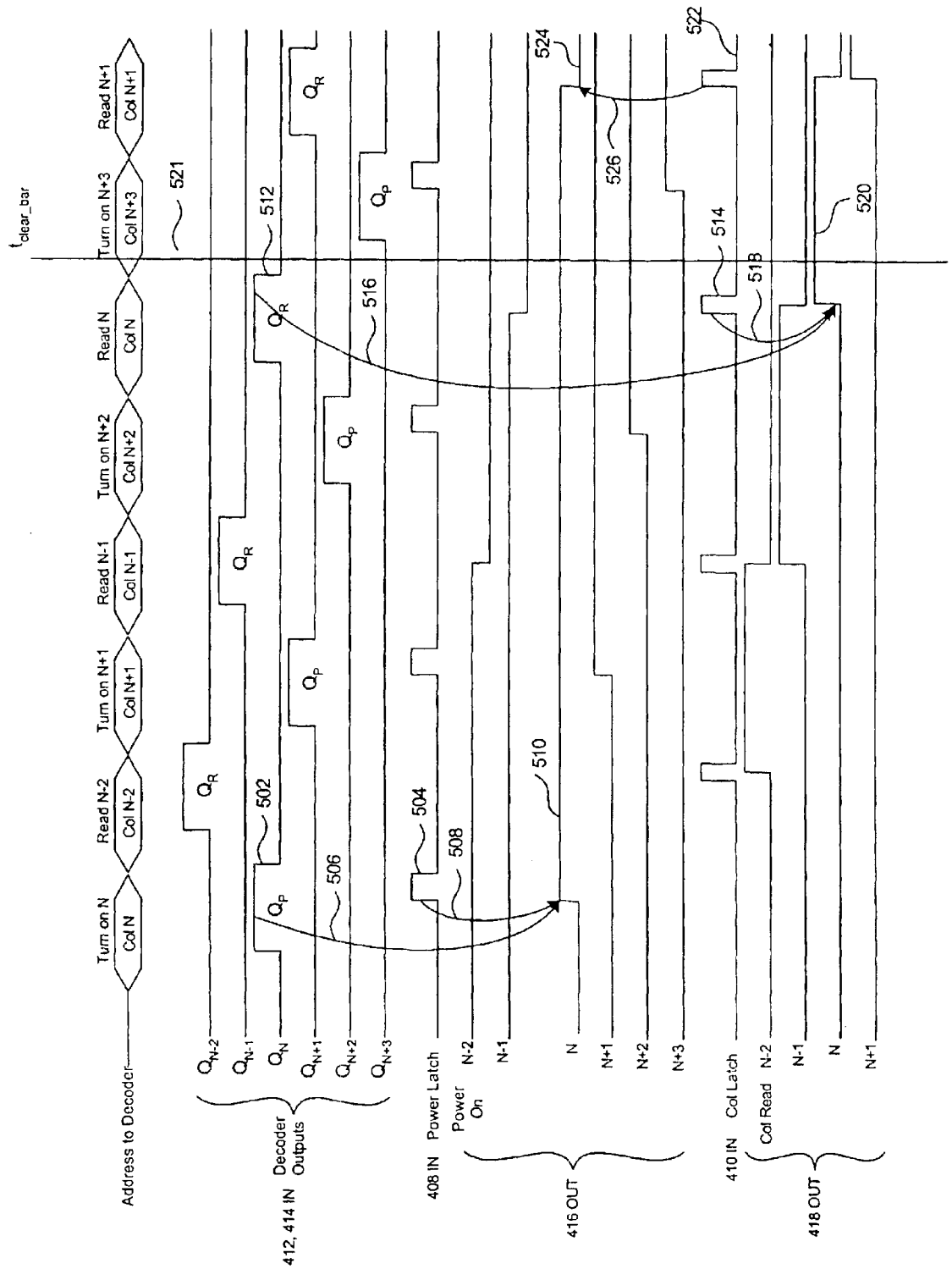
FIG. 5 is a timing diagram that illustrates the operation of the FIG. 4 example look-ahead controller in conjunction with a decoder.

The operation of the FIG. 4 example look-ahead controller circuit 400 may be better understood by reference to the FIG. 5 timing diagram. The notation "IN" or "OUT" is provided as a shorthand designation of whether the particular signal(s) corresponding therewith are input signals or output signals, respectively, to the look-ahead controller 400. The asserted portions of the decoder output signals 412, 414 (corresponding to the power-on control signal 412 and readout control signal 414) are designated, as appropriate, with the designation $Q_P$ or $Q_R$.

Using the example of the Nth column, we now examine the behavior of the Nth Power-On latch 416 and the Nth Column-Read latch 418, based on the behavior of the Nth decoder output signal 412, 414 and the pulses of the power latch signal 408 and the column latch signal 410. We examine assertion of the Nth Power-On latch 416 first. The Nth Power-On latch 416 is asserted (designated by reference numeral 510 in FIG. 5) when the Nth decoder output signal is asserted (designated by reference numeral 502 in FIG. 5) as the power latch signal 408 signal pulses (designated by reference numeral 504 in FIG. 5). The arrows designated by reference numerals 506 and 508 indicate this effect.

We now examine assertion of the Nth Column-Read latch 418. The Nth Column-Read latch 418 is asserted (designated by reference numeral 520 in FIG. 5) when the Nth decoder output signal is asserted (designated by reference numeral 512 in FIG. 5) as the column latch signal 410 pulses (designated by reference numeral 514 in FIG. 5). The arrows designated by reference numerals 516 and 518 indicated this effect.

Finally, we examine deassertion of the Nth Power-On latch 416. First, the Nth clear bar signal 420 (not shown in the FIG. 5 timing diagram) is asserted. As discussed above, the clear bar signal for a particular column (here, the Nth column) is asserted when the Nth Column-Read latch 418 is asserted and the Nth Q signal is not asserted. Referring to FIG. 5, the clear bar signal 420 is asserted at the time designated by "$t_{clear\_bar}$ 521" in FIG. 5. When the column latch signal 410 pulses (designated by reference numeral 522 in FIG. 5) after time $t_{clear\_bar}$ 521, the Nth Power-On latch 416 is deasserted. The arrow designated by reference numeral 526 illustrates this effect.

The FIG. 5 timing diagram illustrates a situation in which the FIG. 4 look-ahead controller 400 receives readout control signals $414Q_R$ that are asserted in a column sequence relationship to each other. In general, though, the FIG. 4 look-ahead controller 400 may effectively operate on readout control signals $414Q_R$ that are asserted in some other relationship to each other, or even in no (or seemingly no) particular relationship to each other.

Figure 6:
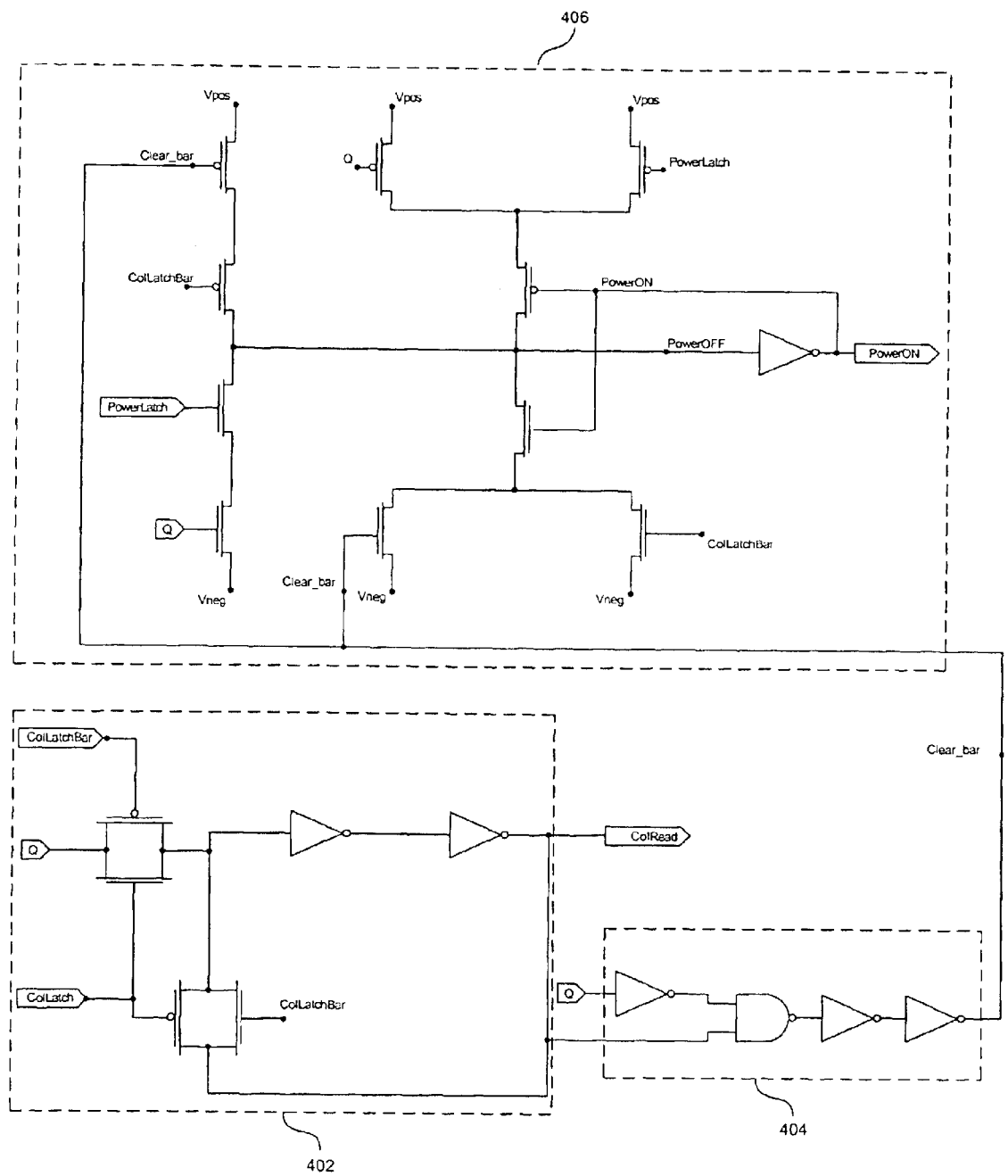
FIG. 6 is a detailed schematic of an example implementation of the FIG. 4 circuit portion.

FIG. 6 is a more detailed, schematic, diagram illustrating an example implementation of the FIG. 4 circuit. The operation of the circuitry illustrated in the FIG. 6 schematic diagram is apparent to one skilled in the art, particularly when examined in conjunction with the overall contents of the present patent application.

While embodiments and applications have been shown and described, it is apparent to those skilled in the art that many more modifications than mentioned above are possible without departing from the inventive concepts herein. For example, in accordance with some aspects of the inventive concepts, the power mode of power consuming circuitry associated with column-arranged circuitry other than image sensor circuitry may be controlled in the manner described in this patent application. For example, the power mode of power consuming circuitry associated with column-arranged memory cells, or other data elements for which it is desirable to be sampled, may be controlled such that power consumption is controlled, but the output values of the columns are reliably available when required. The invention, therefore, is not to be restricted except in the spirit of the appended claims.

Furthermore, from the preceding description, it can be seen that "row" and "column" may be utilized as generic terms to reflect how data element output signals are received from data elements, as opposed to denoting a particular physical positional relationship among the data elements. For example, "row" and "column" as used with image sensors may not denote a particular physical positional relationship of the pixels to an image being sensed.

What is claimed is:

1. An image sensor, comprising:
   a plurality of pixel sensors arranged in at least one row and a plurality of columns, each pixel sensor
      including a photosensor to generate a photosensor output signal nominally indicative of an intensity of light incident on the photosensor, and
      configured to provide a signal corresponding to the photosensor output signal at an output of the pixel sensor,
   for each column,
      a column line coupling together the outputs of the pixel sensors belonging to that column and terminating in a column node for that column; and
      column output circuitry associated with that column to provide to image sensor sampling circuitry a signal corresponding to the column node for that column, based on an asserted state of a column enable signal for that column,
   wherein power consuming circuitry is associated with each column and is controllable between at least a normal power mode and a minimal power mode such that, when the power consuming circuitry associated with a particular column is in the minimal power mode, signals representing photosensor output signals generated by photosensors of that column's pixel sensors are prevented from being reliably provided to the image sensor sampling circuitry; and
   controller circuitry that coordinates the control of the power mode of the power consuming circuitry associated with each column with the state of the column enable signal for that column.

2. The image sensor of claim 1, wherein:
   each pixel sensor includes sensor selection circuitry controllable by a row select signal for the row to which that pixel sensor belongs, to selectively cause the signal corresponding to the photosensor output signal to be provided at the output of the pixel sensor, and
   when the power consuming circuitry for a particular column is in the minimal power mode, the sensor selection circuitry for each pixel belonging to that column is prevented from reliably causing the signal corresponding to the photosensor output signal of that pixel to be provided at the output of that pixel sensor.

3. The image sensor of claim 1, wherein:
   the controller circuitry is configured to coordinate the power mode of the power consuming circuitry associated with each column to be in a predetermined temporal relationship with causing the column enable signal for that column to be in the asserted state.

4. The image sensor of claim 3, wherein:
   the predetermined temporal relationship is such that, for each column, the power mode of the power consuming circuitry associated with that column is controlled to be in the normal power mode at least while the column enable signal for that column is in the asserted state.

5. The image sensor of claim 3, wherein:
   the predetermined temporal relationship is such that, for each column, the power mode of the power consuming circuitry associated with that column is controlled to be in the normal power mode an amount of time before the column enable signal for that column is caused to be in an asserted state, such that the signals representing photosensor output signals generated by photosensors for that column's pixel sensors are stable when the column enable signal for that column is caused to be in the asserted state.

6. The image sensor of claim 5, wherein:
   the amount of time which the power mode for each column is controlled to be in the normal power mode before the column select signal for that column is caused to be in an asserted state is programmable.

7. The image sensor of claim 1, wherein:
   the power consuming circuitry is analog-to-digital converter circuitry.

8. The image sensor of claim 1, wherein:
   the power consuming circuitry is correlated double sampling amplifier circuitry.

9. The image sensor of claim 1, wherein:
   the power consuming circuitry is offset cancellation amplifier circuitry.

10. The image sensor of claim 1, wherein:
    the pixel sensors are active pixel sensors, each active pixel sensor including a follower-type amplifier configured to receive the photosensor output signal for that active pixel sensor at an input of the follower-type amplifier and to provide a corresponding buffered sensor signal at an output of the follower-type amplifier;
    the pixel sensor output signal for each active pixel sensor corresponds to the buffered sensor signal at the output of the follower-type amplifier of the active pixel sensor of that pixel;

the power consuming circuitry associated with each column is a bias current supply circuit connected to provide a bias current to the follower-type amplifiers of the active pixel sensors of that column; and when the bias current supply, associated with each column, is in the minimal power mode, the follower-type amplifier for each active pixel sensor in that column is prevented from reliably providing the buffered sensor signal corresponding to the photosensor output signal for that active pixel sensor.

11. The image sensor of claim 10, wherein each active pixel sensor includes sensor selection circuitry controllable by a row select signal for the row to which that active pixel sensor belongs, to selectively allow the buffered sensor signal corresponding to the photosensor output signal for that active pixel sensor to be provided at the output of the pixel sensor.

12. The image sensor of claim 1, wherein:

for each column, signal conditioning circuitry is configured to input a signal corresponding to the signal at the column node for that column and to output a conditioned signal corresponding thereto;

the signal provided to the image sensor sampling circuitry for the column corresponds to the conditioned signal output from the signal conditioning circuitry for that column;

the power consuming circuitry associated with each column is a current source circuit connected to provide an operating current to the signal conditioning circuitry of that column; and when the current source circuit, associated with each column, is in the minimal power mode, the signal conditioning circuitry for that column is prevented from reliably outputting the conditioned output signal.

13. The image sensor of claim 12, wherein:

for each column, the column output circuitry for that column includes column select circuitry configured to selectively provide the signal at the column node for that column to the signal conditioning circuitry for that column based on the state of the enable signal for that column.

14. The image sensor of claim 12, wherein:

for each column, the column output circuitry for that column includes column select circuitry configured to selectively provide the conditioned output signal for that column.

15. The image sensor of claim 12, wherein:

the signal conditioning circuitry includes an amplifier.

16. The image sensor of claim 12, wherein:

the signal conditioning circuitry includes an analog-to-digital converter.

17. An integrated circuit, comprising:

a plurality of data element circuits arranged in at least one row and a plurality of columns, each data element circuit configured to provide a data element circuit output signal at an output of the data element circuit;

for each column, a column line coupling together the outputs of the data element circuits belonging to that column and terminating in a column node for that column; and column output circuitry associated with that column to provide to sampling circuitry a signal corresponding to the column node for that column, based on an asserted state of a column select signal for that column, wherein power consuming circuitry is associated with each column and is controllable between at least a normal power mode and a minimal power mode such that, when the power consuming circuitry associated with a particular column is in the minimal power mode, signals representing data element output signals of that column's data elements are prevented from being reliably provided to the sampling circuitry; and controller circuitry to, for each column, coordinate controlling the power mode of the power consuming circuitry associated with that column with the asserted state of the column select signal for that column.

18. The integrated circuit of claim 17, wherein:

each data element circuit includes data element circuit selection circuitry controllable by a row select signal for the row to which that data element circuit belongs, to selectively cause the signal corresponding to the data element circuit output signal to be provided at the output of the data element circuit; and when the power consuming circuitry for a particular column is in the minimal power mode, the data element circuit selection circuitry for each data element circuit belonging to that column is prevented from reliably causing the signal corresponding to the data element circuit output signal of that data element circuit to be provided at the output of that data element circuit.

19. The integrated circuit of claim 17, wherein:

the controller circuitry is configured to coordinate the power mode of the power consuming circuitry associated with each column to be in a predetermined temporal relationship with causing the column enable signal for that column to be in the asserted state.

20. The integrated circuit of claim 19, wherein:

the predetermined temporal relationship is such that, for each column, the power mode of the power consuming circuitry associated with that colimn is controlled to be in the normal power mode at least while the column enable signal for that column is in the asserted state.

21. The integrated circuit of claim 19, wherein:

the predetermined temporal relationship is such that, for each column, the power mode of the power consuming circuitry associated with that column is controlled to be in the normal power mode an amount of time before the column enable signal for that column is caused to be in an asserted state, such that the signals representing data circuit element output signals generated by data element circuits of that column are stable when the column enable signal for that column is caused to be in the asserted state.

22. The integrated circuit of claim 21, wherein;

the amount of time which the power mode for each column is controlled to be in the normal power mode before the column select signal for that column is caused to be in an asserted state is programmable.

23. The integrated circuit of claim 17, wherein:

the power consuming circuitry is analog-to-digital converter circuitry.

24. The integrated circuit of claim 17, wherein:

the power consuming circuitry is correlated double sampling amplifier circuitry.

25. The integrated circuit of claim 17, wherein:

the power consuming circuitry is offset cancellation amplifier circuitry.

26. The integrated circuit of claim 17, wherein:

for each column, signal conditioning circuitry is configured to input a signal corresponding to the signal at the column node for that column and to output a conditioned signal corresponding thereto;

the signal provided to the sampling circuitry for the column corresponds to the conditioned signal output from the signal conditioning circuitry for that column;

the power consuming circuitry associated with each column is a current source circuit connected to provide an operating current to the signal conditioning circuitry of that column; and when the current source circuit, associated with each column, is in the minimal power mode, the signal conditioning circuitry for that column is prevented from reliably providing the conditioned output signal.

27. The integrated circuit of claim 26, wherein:

for each column, the column output circuitry for that column includes column select circuitry configured to selectively provide the signal at the column node for that column to the signal conditioning circuitry for that column based on the state of the enable signal for that column.

28. The integrated circuit of claim 26, wherein:

for each column, the column output circuitry for that column includes column select circuitry configured to selectively provide the conditioned output signal for that column.

29. The integrated circuit of claim 26, wherein:

the signal conditioning circuitry includes an amplifier.

30. The integrated circuit of claim 26, wherein:

the signal conditioning circuitry includes an analog-to-digital converter.

* * * * *